Nov. 17, 1964 C. P. ATWOOD 3,157,226
REGENERATOR SEAL
Filed June 6, 1961
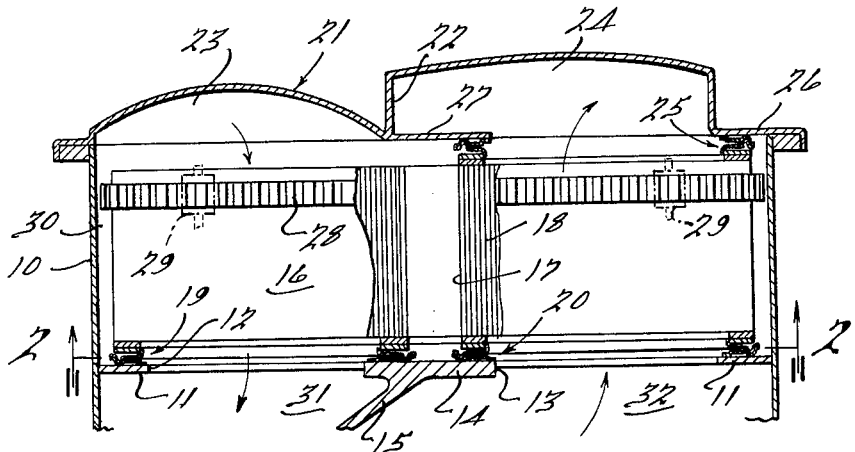
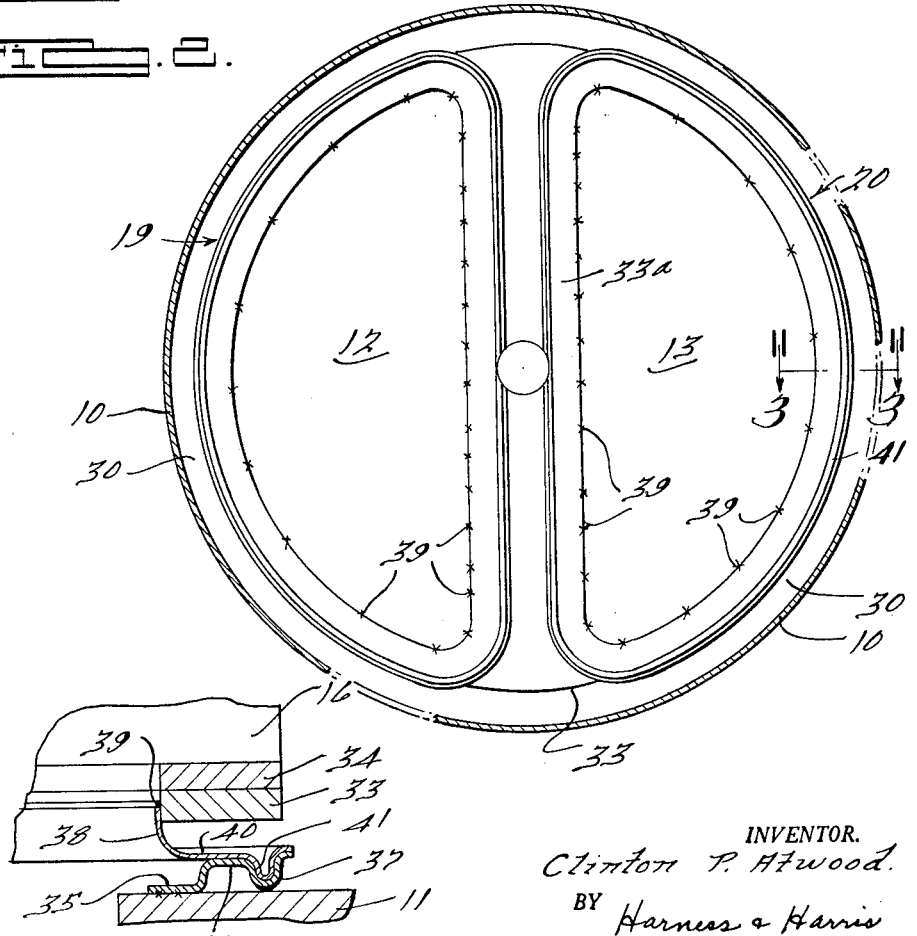
INVENTOR.
Clinton P. Atwood.
BY Harness & Harris
ATTORNEYS

United States Patent Office 3,157,226
Patented Nov. 17, 1964

3,157,226
REGENERATOR SEAL
Clinton P. Atwood, Warren, Mich., assignor to Chrysler Corporation, Highland Park, Mich., a corporation of Delaware
Filed June 6, 1961, Ser. No. 115,150
11 Claims. (Cl. 165—9)

This invention relates to gas turbine engines and has for an important object the provision of an improved arrangement in the gas flow passages in communication with the regenerator of the engine and to the sealing structure between said passages and regenerator.

One type of gas turbine engine employs a cylindrical disc-type regenerator rotatable about its central axis and comprising a matrix of small parallel axial gas passages. The gas passage system conducts comparatively cool inlet gases to one sector of the regenerator matrix so as to be heated by passage therethrough, and conducts comparatively hot exhaust gases to another sector of the matrix to heat the latter by passage therethrough. As the regenerator rotates, different portions of the matrix are rotated successively between the hot and cool gases. In consequence, the regenerator is subject to continuously changing temperatures and warping conditions, such that the maintenance of a gas tight seal at the juncture between the conduit system and regenerator is rendered difficult.

It has been common heretofore to employ a flexible non-rotatable sector plate having a sector shaped opening therein comprising part of the conduit system, the plate being intended to conform closely to one of the plane faces of the regenerator matrix in sliding and sealing engagement therewith entirely around the sector opening. A flexible sealing element is secured, as for example by welding, to the sector plate and to a fixed portion of the conduit system to complete a fluid tight seal therebetween entirely around the sector opening. In accordance with such structures known heretofore, the connection between the sealing element and sector plate has prevented the latter from conforming as closely as required to the plane surface of the regenerator matrix. Accordingly, the sealing engagement between the sector plate and matrix has been impaired.

Another object of the invention is to provide an improved combination and arrangement of elements in the conduit system and seal between the latter and regenerator whereby the sector plate is adapted to conform readily to the continuously warping and rotating surface of the regenerator matrix.

Another and more specific object is to provide such a structure wherein the outer periphery of the sector plate and seal around the sector opening is exposed to comparatively cool gases with respect to the temperature of the gases passing through the sector opening, and the sealing element is welded to the sector plate at the inner edge thereof which defines the sector opening.

By such a construction, the weld which extends as a seam entirely around the sector opening subjects the sector plate to a radially inwardly directed stress tending to maintain the sector plate in a flat condition. This effect results because of shrinkage of the weld seam when the latter cools below the welding temperature. If it were not for the weld seam, the outer periphery of the sector plate exposed to the comparatively cool gases would be subject to less thermal expansion than the inner periphery, such that a radially inwardly directed force on the outer periphery of the sector plate would warp the latter to a conical shape. By virtue of the preshrunk weld seam, the inner periphery of the sector plate is constrained against thermal expansion. During engine operation, as the weld seam is heated to the operating condition, its radial stress tending to flatten the sector plate decreases in consequence of thermal expansion. However, by suitably determining the thickness of the weld seam, the relative expansion of the inner periphery of the sector plate with respect to its outer periphery can be controlled at the operating temperature of the engine, so as to neutralize at least in part the stress tending to deform the sector plate to a conical shape. In consequence, the sector plate will remain substantially flat during operation and will conform to the surface of the regenerator matrix as required to enhance the sealing engagement therewith.

Other objects of this invention will appear in the following description and appended claims, reference being had to the accompanying drawings forming a part of this specification wherein like reference characters designate corresponding parts in the several views.

FIGURE 1 is a fragmentary vertical mid sectional view through the regenerator of a gas turbine engine.

FIGURE 2 is a bottom view of the regenerator seal, with the resilient sealing bracket removed, taken in the direction of the arrows 2—2 of FIGURE 1.

FIGURE 3 is a transverse section taken in the direction of the arrows substantially along the line 3—3 of FIGURE 2.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a portion of a gas turbine engine embodying the present invention is illustrated by way of example comprising a housing having a cylindrical regenerator chamber 10. The bottom of the chamber 10 is defined by a cylindrical support 11 secured at its outer periphery to the side wall of the chamber 10 and being formed with a high pressure sector opening 12 and a low pressure sector opening 13 partitioned by a diametrically extending cross arm 14. The latter is supported by a baffle or bulkhead 15 which extends radially inwardly from the support 11 and supports the outer shroud for the usual gas driven rotors and annular passage which conducts motive gases to the rotors.

Rotatable within chamber 10 is a cylindrical disc-type regenerator 16 having plane parallel top and bottom surfaces of a matrix 18 comprising a plurality of small parallel gas passages extending axially of a central hollow regenerator hub 17 about which the regenerator rotates. The regenerator 16 is resiliently supported and spaced from support 11 by seals indicated generally at 19 and 20 around the openings 12 and 13 respectively. A cover 21 for the chamber 10 is provided with a transverse beam 22 extending in parallelism with the cross arm 14 so as to partition the cover 21 into an inlet dome 23 overlying the sector opening 12 and an exhaust dome 24 overlying sector opening 13. Coextensive with seal 20 is an upper seal 25 arranged between the upper surface of the regenerator matrix 18 and a circumferential flange 26 of the cover 21. The flange 26 extends semi-circularly around an area coextensive with the opening 13 and is joined at its opposite ends with an integral cross flange 27 of beam 22 overlying the cross arm 14. The seals 19 and 25 are mirror images of the seal 20, so that only the latter will be described herein.

Extending coaxially around the regenerator 16 and secured thereto in driving relation is a ring gear 28 in mesh with a plurality of uniformly spaced gears 29 carried by the housing 10 so as to maintain the regenerator 16 centrally located within its cylindrical chamber. One of the gears 29 may be suitably connected with one of the turbine rotors to be driven thereby, so as to rotate the regenerator 16 continuously during operation of the engine. The outer periphery of the regenerator 16 is spaced from the inner wall of the chamber 10 to provide an annular space 30 surrounding the regenerator and in communication with dome 23 so as to receive comparatively cool high pressure inlet air therefrom to bathe the driving mechanism including gear 28 and gears 29 in a cooling medium. In accordance with the structure shown, inlet air is supplied to dome 23 from a conventional compressor. From dome 23, the comparatively cool and high pressure inlet air flows downwardly in the direction of the arrows through a sector of the regenerator 16 overlying opening 12 and thence into chamber 31 below the regenerator.

During the axial downward flow of the gases through the regenerator at the sector 12, these gases absorb heat from the regenerator and are discharged at elevated temperature into region 31. The hot gases are then conducted to a combustion chamber where fuel is added and burned. The hot combustion products are then directed through the turbine rotors to drive the same and are exhausted into region 32 immediately below sector opening 13. In this regard, the turbine structure including baffle 15 and seals 19, 20 and 25 prevent shortcircuiting of the gas flow. From region 32, the comparatively hot exhaust gases flow upwardly through the sector opening 13 and the overlying portion of the regenerator matrix to heat the same, the gases finally being exhausted into chamber 25.

The seal 20 includes a sector plate 33 which includes a semi-circular baffle portion extending around the circular periphery of opening 13 and joined at its ends with a diametrical cross portion 33a overlying cross arm 14. In the present instance the corresponding sector plate of the seal 19 is integral with the sector plate 33, the two sector plates combining to provide an annular rim around the openings 12 and 13 and a comparatively wide unitary cross portion, half being formed by cross portion 33a and the other half being formed by a similar coplanar cross portion associated with the sector opening 12.

Also formed integrally with the upper surface of the sector plate 33 is a rubbing seal 34 which extends entirely around the sector opening 13 in sliding and sealing engagement with the under surface of the regenerator matrix 18, FIGURE 3.

In this regard, the sector plate 33 and seal 34 are sufficiently flexible so as to conform closely to the regenerator matrix in sealing engagement therewith as the latter continuously warps during operation.

Suitably secured to the support 11 and 14, as for example by welding, so as to provide a gas tight seal therewith entirely around the opening 13 is a resilient clamping bracket 35 Radially outwardly of the welded connection between the bracket 35 and supports 11 and 14, the bracket 35 is spaced at 36 from the support portions and terminates in a resilient upwardly opening channel 37 which likewise extends entirely around the opening 13. In order to support the sector plate 33 and the weight of the regenerator 16 thereon, a flexible resilient seal 38 is welded at 39 to the inner edge of the sector plate 33 which defines the opening 13, the weld 39 being effective to provide a fluid tight seam entirely around the opening 13. From the weld 39, the seal 38 extends downwardly in a loop 40 and along the bracket portion 36 and terminates in a channel portion 41 adapted to be resiliently confined within channel 37 to effect a fluid tight seal therewith entirely around the opening 13.

By virtue of the weld 39, the inner peripheral edge of the sector plate 33 is subject to a radially inwardly directed force tending to maintain the sector plate 33 in its desired flat condition. The outer peripheral edge of the sector plate 33 is exposed to the cool gases contained within the space 30 and the hollow bore of hub 17. Thus during operation of the seal, a radially inwardly directed temperature gradient exists in the sector plate 33, tending to cause greater thermal expansion at its inner periphery than at its outer periphery. By suitably determining the thickness of the weld seam 39 with respect to the material and thickness of plate 33 and seal 38, the thermally induced forces tending to distort plate 33 to a conical shape are neutralized and the latter is maintained in a desired flat condition to enhance the sealing between the rubbing seal portion 34 and the underside of the regenerator matrix 18.

I claim:

1. In a gas turbine engine, a rotatable regenerator, a gas passage conduit in communication with said regenerator, a sector plate having an opening therethrough defining a portion of said conduit, said sector plate also having one side in sliding and sealing engagement with the rotating surface of said regenerator entirely around said opening, a fixed support defining a portion of said conduit, a flexible sealing element extending entirely around said opening, means securing said sealing element to said support to effect a fluid sealing juncture therewith entirely around said opening, said sealing element having an edge welded to said sector plate at the inner edge of the latter defining said opening to effect a fluid sealing weld seam extending entirely around said opening and subjecting said inner edge to force directed inwardly of said opening tending to constrict the latter.

2. In the combination according to claim 1, said opening being approximately semi-circular and said sector plate comprising an annular rim segment extending around the circular periphery of said opening and joined at its opposite ends by a diametrically extending portion of said plate.

3. In the combination according to claim 1, said sealing element being of resilient material yieldingly supporting said sector plate and regenerator and spacing said plate from said support, said opening being approximately semi-circular and said sector plate comprising an annular rim segment extending around the circular periphery of said opening and joined at its opposite ends by a diametrically extending portion of said plate.

4. In a gas turbine engine, a regenerator housing, a regenerator rotatably mounted in said housing and comprising a matrix of gas passages for conducting gases therethrough, conduit means in communication with said regenerator for partitioning comparatively cool gases from comparatively hot gases, said conduit means including a conduit for conducting hot gases, a sector plate having an opening therethrough defining a portion of said conduit, said sector plate also having one surface in sliding and sealing engagement with the rotating surface of said regenerator entirely around said opening, a fixed support defining a portion of said conduit, a flexible sealing element having an edge welded to said sector plate at the inner edge of the latter defining said opening to effect a fluid sealing weld seam between said element and plate entirely around said opening, the outer periphery of said sector plate being exposed to said cool gases to effect a radial temperature gradient in said sector plate applying a force tending to bow said plate to a conical shape, said weld seam being exposed to the hot gases in said conduit and being dimensioned to exert a force directed inwardly of said opening tending to neutralize the first-named force and maintain said sector plate in a plane condition, and means securing said sealing element and support together to effect a fluid seal therebetween entirely around said opening.

5. The combination according to claim 4 wherein said fixed support extends entirely around said opening in proximity to an outer surface of said sector plate opposite said surface thereof in engagement with said regenerator.

6. The combination according to claim 4 wherein said sector plate and the surface of said regenerator in sliding engagement with said sector plate are substantially plane, and wherein said opening is approximately semi-circular, said sector plate comprising an annular rim segment extending around the circular periphery of said opening and being joined at its opposite ends by a diametrically extending chord portion of said sector plate.

7. The combination according to claim 4 wherein said fixed support extends entirely around said opening in proximity to an outer surface of said sector plate opposite said inner surface, said sector plate and the surface of said regenerator in sliding engagement with said sector plate are substantially plane, and wherein said opening is approximately semi-circular, said sector plate comprising an annular rim segment extending around the circular periphery of said opening and being joined at its opposite ends by a diametrically extending chord portion of said sector plate.

8. In a gas turbine engine, a regenerator housing, a regeneartor rotatably mounted in said housing and comprising a matrix of gas passages for conducting gases therethrough, conduit means in communication with said regenerator for partitioning comparatively cool gases from comparatively hot gases, said conduit means including a pair of conduits for conducting said hot gases, a sector plate having a pair of approximately semi-circular sector openings therein defining portions of said pair of conduits respectively, said sector plate having one surface in sliding and sealing engagement with the rotating surface of said regenerator entirely around one of each of said openings, fixed supports defining portions of said conduits respectively, a pair of flexible sealing elements, each having an edge welded to said sector plate at the inner edge of the latter defining one of each of said openings to effect a fluid sealing weld seam between the element and plate entirely around the associated opening, said sector plate comprising an annular rim extending around the circular peripheries of said sector openings and having a diametrically extending portion separating said openings, the outer periphery of said sector plate being exposed to said cool gases to effect a radial temperature gradient in said sector plate applying a force tending to bow said plate to a conical shape, the two weld seams being exposed to said hot gases in said pair of conduits respectively and being dimensioned to exert a radially inwardly directed force tending to neutralize the first-named force and maintain said sector plate in a plane condition, and means securing each sealing element to its associated support to effect a fluid seal therewith entirely around the associated sector opening.

9. The combination according to claim 8 wherein said sealing elements are of resilient material yieldingly supporting said sector plate and regenerator and spacing said plate from said support.

10. In a gas turbine engine, a rotatable regenerator, conduit means for conducting separate streams of comparatively hot and cool gases and including a gas passage conduit for said comparatively hot gases in communication with said regenerator, a sector plate having an opening therethrough defining a portion of said conduit, said sector plate also having one side in sliding and sealing engagement with the rotating surface of said regenerator entirely around said opening, a fixed support defining a portion of said conduit, a flexible sealing element extending entirely around said opening, means securing said sealing element to said support to effect a fluid sealing juncture therewith entirely around said opening, said sealing element having an edge welded to said sector plate at the inner edge of the latter defining said opening to effect a fluid sealing weld seam extending entirely around said opening and subjecting said inner edge to force directed inwardly of said opening tending to constrict the latter, said gas passage means directing said comparatively cool gases to the outer edge of said sector plate remote from said opening to effect a temperature gradient in said sector plate tending to induce greater thermal expansion at said inner edge than at said outer edge.

11. In a sealing structure for the rotatable regenerator of a gas turbine engine having conduit means for conducting separate streams of comparatively hot and cool gases and including a pair of conduits in communication with said regenerator for conducting said comparatively hot gases thereto, a sector plate having a pair of approximately semi-circular sector openings therein defining portions of said pair of conduits respectively, said sector plate having one surface in sliding and sealing engagement with the rotating surface of said regenerator entirely around one of each of said openings, fixed supports defining portions of said conduits respectively, a pair of flexible sealing elements, each having an edge welded to said sector plate at the inner edge of the latter defining one of each of said openings to effect a fluid sealing weld seam between the element and plate entirely around the associated opening, said sector plate comprising an annular rim extending around the circular peripheries of said sector openings and having a diametrically extending portion separating said openings, said gas passage means being in communication with the outer periphery of said sector plate for conducting said comparatively cool gases thereto to effect a radial temperature gradient in said sector plate applying a force tending to bow said plate to a conical shape, the two weld seams being exposed to said hot gases in said pair of conduits respectively and being dimensioned to exert a radially inwardly directed force tending to neutralize the first-named force and maintain said sector plate in a plane condition, and means securing each sealing element to its associated support to effect a fluid seal therewith entirely around the associated sector opening.

References Cited in the file of this patent

UNITED STATES PATENTS

| | | |
|---|---|---|
| 2,880,972 | Williams | Apr. 7, 1959 |
| 2,902,267 | Rich | Sept. 1, 1959 |
| 2,969,644 | Williams et al. | Jan. 31, 1961 |

UNITED STATES PATENT OFFICE
CERTIFICATE OF CORRECTION

Patent No. 3,157,226                      November 17, 1964

Clinton P. Atwood

It is hereby certified that error appears in the above numbered patent requiring correction and that the said Letters Patent should read as corrected below.

Column 5, line 16, for "geneartor" read -- generator --; column 6, line 19, for "sealing structure for the rotatable regenerator" read -- gas turbine engine, a rotatable regenerator, --; line 20, strike out "of a gas turbine engine having".

Signed and sealed this 15th day of March 1966.

(SEAL)
Attest:

ERNEST W. SWIDER
Attesting Officer

EDWARD J. BRENNER
Commissioner of Patents